(12) United States Patent
Li

(10) Patent No.: US 8,085,170 B2
(45) Date of Patent: Dec. 27, 2011

(54) WIRELESS COMMUNICATION DEVICE WITH VIBRATING MODULE

(75) Inventor: Hao-Jung Li, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 950 days.

(21) Appl. No.: 11/955,285

(22) Filed: Dec. 12, 2007

(65) Prior Publication Data

US 2009/0027233 A1 Jan. 29, 2009

(30) Foreign Application Priority Data

Jul. 27, 2007 (CN) .......................... 2007 1 0075432

(51) Int. Cl.
*H03M 11/00* (2006.01)
(52) U.S. Cl. ..................... 341/20; 340/407.2; 341/27
(58) Field of Classification Search .............. 341/20–35, 341/63–66; 340/407.1, 407.2, 7.6, 7.61; 455/90, 550, 566, 567
See application file for complete search history.

(56) References Cited

U.S. PATENT DOCUMENTS 6,378,234 B1 * 4/2002 Luo ................................. 341/22
6,850,782 B2 * 2/2005 Bright et al. ................... 455/567
7,831,208 B2 * 11/2010 Nelson et al. .................... 455/72
2008/0136678 A1 * 6/2008 Harrington ...................... 341/20

FOREIGN PATENT DOCUMENTS

| CN | 1549641 A | 11/2004 |
|---|---|---|
| CN | 1848043 A | 10/2006 |
| JP | 2002287880 A | 10/2002 |

OTHER PUBLICATIONS

International Telecommunication Union (ITU), "Recomendation ITU-R M.1677 International Morse Code", 2004, pp. 1-6.*

* cited by examiner

*Primary Examiner* — Timothy Edwards, Jr.
*Assistant Examiner* — Franklin Balseca
(74) *Attorney, Agent, or Firm* — Altis Law Group, Inc.

(57) ABSTRACT

A wireless communication device (100) includes a communicating module (16), a sensor module (26) and a decoding module (28). The communicating module receives and sends character messages. The sensor module receives vibration and transforms the vibration into input signal. The decoding module is electronically connected to the communicating module and the sensor module. The decoding module receives the input signals from the sensor module and transforms the input signals into character messages and transfers the character messages to the communicating module to send.

15 Claims, 5 Drawing Sheets

WIRELESS COMMUNICATION DEVICE WITH VIBRATING MODULE

BACKGROUND OF THE INVENTION

1. Field of the Invention

The present invention relates to wireless communication devices and, particularly, to a wireless communication device with a vibrating module.

2. Description of Related Art

Nowadays, many wireless communication devices, such as mobile phones and laptops have vibrating modules. In circumstances where silence is required, the wireless communications devices can be switch to silent mode. In this way, noise generated from the wireless communication device is eliminated by the use of the vibrating modules.

However, when the user is alerted by the vibrating of the wireless communication devices, they must view the screen of the wireless communication device to read the messages and the phone number of the message sender, and reply calls and messages using the keypads of the wireless communication devices. Thus, the vibrating modules of such typical wireless communication devices cannot be used to simplify the operations of viewing and replying calls and messages.

Another kind of typical wireless communication device has a function of expressing messages via vibration. Such wireless communication device includes an encoding module and a vibrating module. The encoding module of the wireless communication device transforms character messages into code signals formed by some kinds of basic unit signals in typical methods, such as a basic unit signal for a short time and a basic unit signal for a long time (i.e., the method of Morse), and transfers the code signals to the vibrating module. The vibrating module thus vibrates in different modes respectively corresponding to the different kinds of the basic unit signals according to the code signals. In this way, other than the typical communicating methods such as voice and characters, wireless communication device can express character messages via vibration. However, such wireless communication device can only expresses received character messages via vibration, character messages still need to be inputted by the use of keypads of the wireless communication device.

Therefore, a new wireless communication device is desired in order to overcome the above-described shortcomings.

SUMMARY

In one aspect, a wireless communication device includes a communicating module, a sensor module and a decoding module. The communicating module receives and sends character messages. The sensor module receives vibration and transforms the vibration into input signal. The decoding module is electronically connected to the communicating module and the sensor module. The decoding module receives the input signals from the sensor module and transforms the input signals into character messages and transfers the character messages to the communicating module to send.

Other advantages and novel features will become more apparent from the following detailed description when taken in conjunction with the accompanying drawings.

BRIEF DESCRIPTION OF THE DRAWINGS

Many aspects of the present wireless communication device can be better understood with reference to the following drawings. The components in the various drawings are not necessarily drawn to scale, the emphasis instead being placed upon clearly illustrating the principles of the present wireless communication device. Moreover, in the drawings, like reference numerals designate corresponding parts throughout the diagrams.

DETAILED DESCRIPTION OF THE INVENTION

Figure 1:
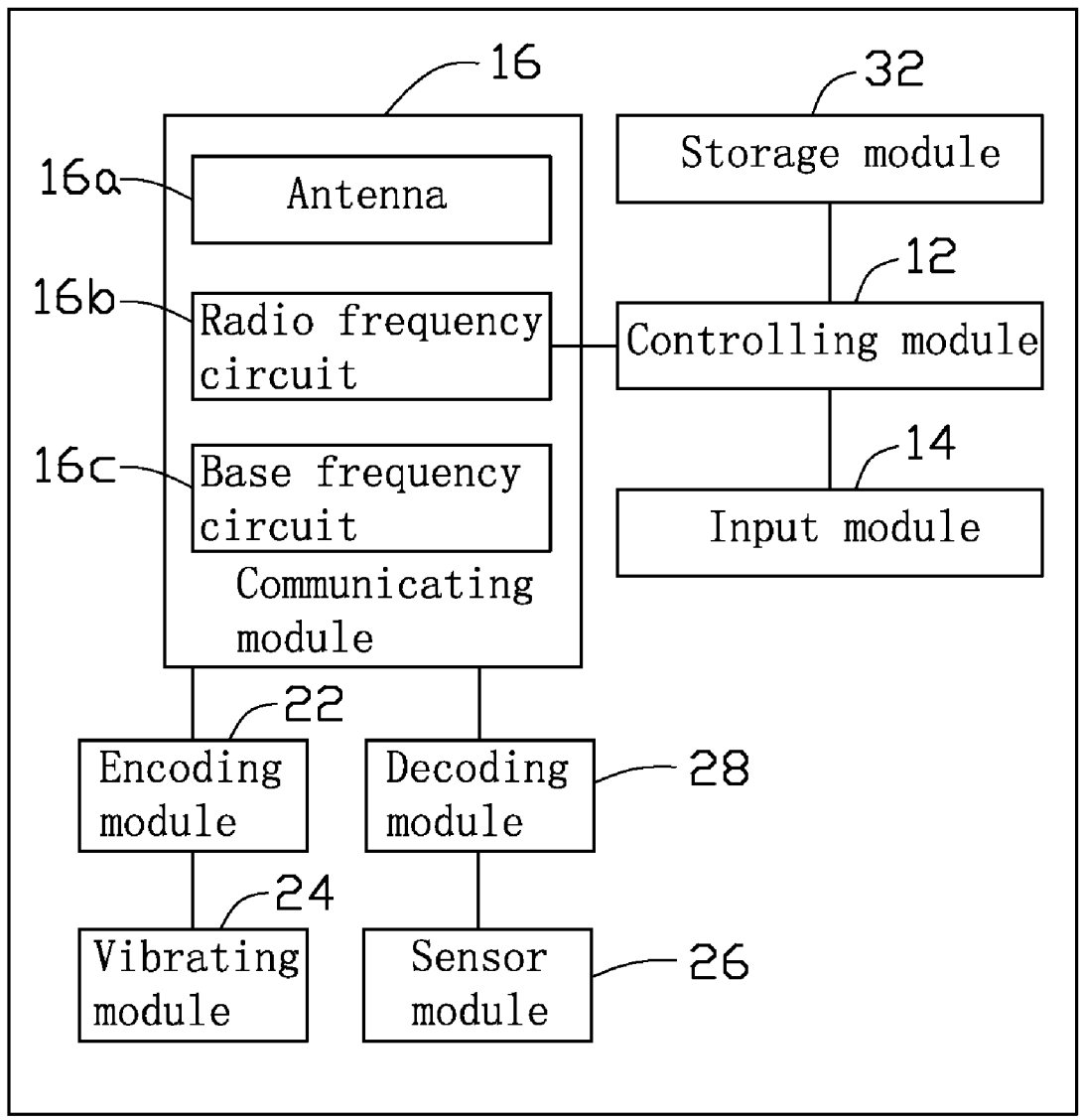
FIG. 1 is a diagram of a wireless communication device, in accordance with a present embodiment.
Figure 2:
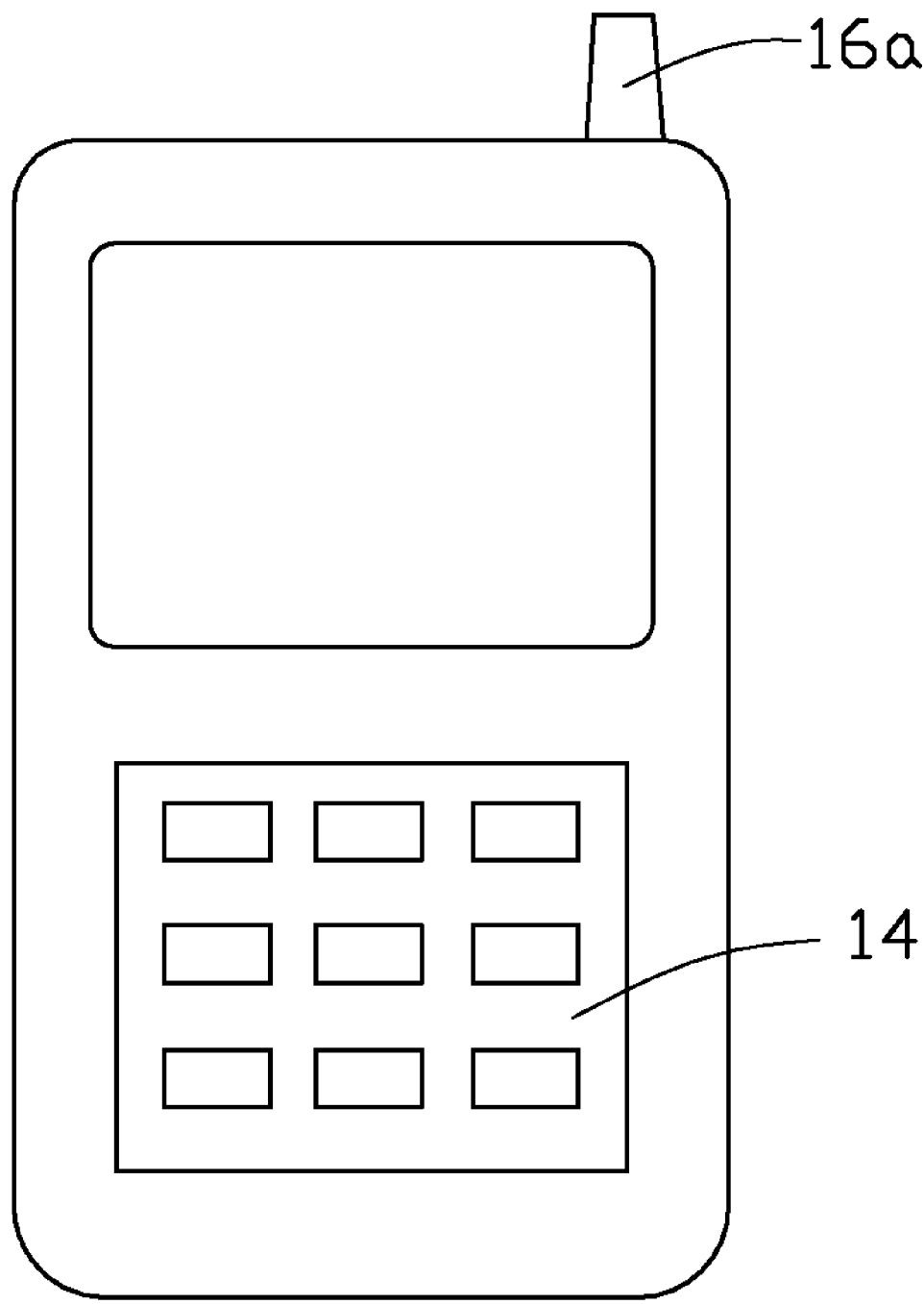
FIG. 2 is a schematic view of the wireless communication device shown in FIG. 1.

Referring now to the drawings in detail, FIG. 1 shows a wireless communication device 100, in accordance with a present embodiment. The wireless communication device 100 can be a mobile phone, an interphone, a laptop, etc. The wireless communication device 100 includes a controlling module 12, an input module 14, a communicating module 16, an encoding module 22, a vibrating module 24, a sensor module 26, a decoding module 28 and a storage module 32.

The controlling module 12 is a microprocessor and installed in the circuit board (not shown) of the wireless communication device 100. The input module 14, the communicating module 16 and the storage module 32 are all electronically connected to the controlling module 12 and controlled by the controlling module 12.

The input module 14 includes a keypad (not shown) and defines at least one sensing area 142 on a back surface of the wireless communication device 100. The keypad is used to operate the wireless communication device 100. The sensing area 142 is connected to the sensor module 26. The sensor module 26 receives vibration caused by the knock or press on the sensing area 142. Understandably, the sensing area 142 can also be a button.

The communicating module 16 is electronically connected to the encoding module 22 and the decoding module 28. The communicating module 16 includes an antenna 16a, a radio frequency (RF) circuit 16b and a base frequency (BF) circuit 16c. The base frequency circuit 16c processes low-frequency electronic signals transformed from voice, characters and vibration by the wireless communication device 100, and transfer the transformed low-frequency electronic signals to the radio frequency circuit 16b. The radio frequency circuit 16b then transforms the processed low-frequency electronic signals into high-frequency electronic signals and transfer the high-frequency electronic signals to the antenna 16a. The antenna 16a sends the high-frequency electronic signals onto a wireless communication network. The antenna 16a can also receive high-frequency electronic signals from the wireless communication network, and transfer the high-frequency electronic signals to the radio frequency circuit 16b. The radio frequency circuit 16b then transforms the high-frequency electronic signals into low-frequency electronic signals and transfers the low-frequency electronic signals to the base frequency circuit 16c. The base frequency circuit 16c processes the low-frequency electronic signals and transfer the processed low-frequency electronic signals to predetermined hardware, such as a microphone, a display or a vibrating module, to express the electronic signals in corresponding modes.

The encoding module 22 is electronically connected to the vibrating module 24. Character messages received by the wireless communication device 100 can be transformed into code signals by the encoding module 22, and the code signals can be expressed by means of vibration of the vibrating module 24. In the present embodiment, the method for transforming character messages into code signals is similar to the method of Morse, i.e., character messages are transformed into codes formed by two kinds of basic units, and two kinds of vibration are respectively used to express the two kinds of basic units. In this way, combinations of the two kinds of vibration can be used to express character messages.

For example, in the method of Morse, the letter A is expressed by a combination of a basic unit dit and another basic unit dah. The letter D is expressed by a combination of three dits. The letter Z is expressed by a combination of two dits and two dahs lines in an order of dit, dit, dah, dah. Other letters, numbers and Chinese characters can also be expressed by combinations of dits and dahs lining in predetermined orders. In this way, the encoding module 22 transforms character messages into code signals formed by combinations of two kinds of basic units respectively corresponding to the two basic units of Morse.

The vibrating module 24 is a typical vibrating apparatus used in wireless communication devices, such as an eccentric motor. The encoding module 22 transfers the code signals to the vibrating module 24, and the vibrating module 24 expresses the code signals by means of vibration. Since the code signals are formed by combinations of two kinds of basic units, i.e., the unit dit and the unit dah of Morse, the vibrating module 24 uses two kinds of vibration to express the two kinds of basic units respectively. For example, a short vibration of the vibrating module 24 expresses the basic unit dit, and a long vibration of the vibrating module 24 expresses the basic unit dah. Understandably, the two kinds of vibration can also be differentiated by other parameters that can be sensed by users, such as frequency and swing, etc. In this way, the wireless communication module 100 can express character messages by means of combinations of two kinds of vibration. In the present embodiment, the basic unit dit is expressed by a vibration of 0.5 seconds, and the basic unit dah is expressed by a vibration of 2 seconds.

Figure 4:
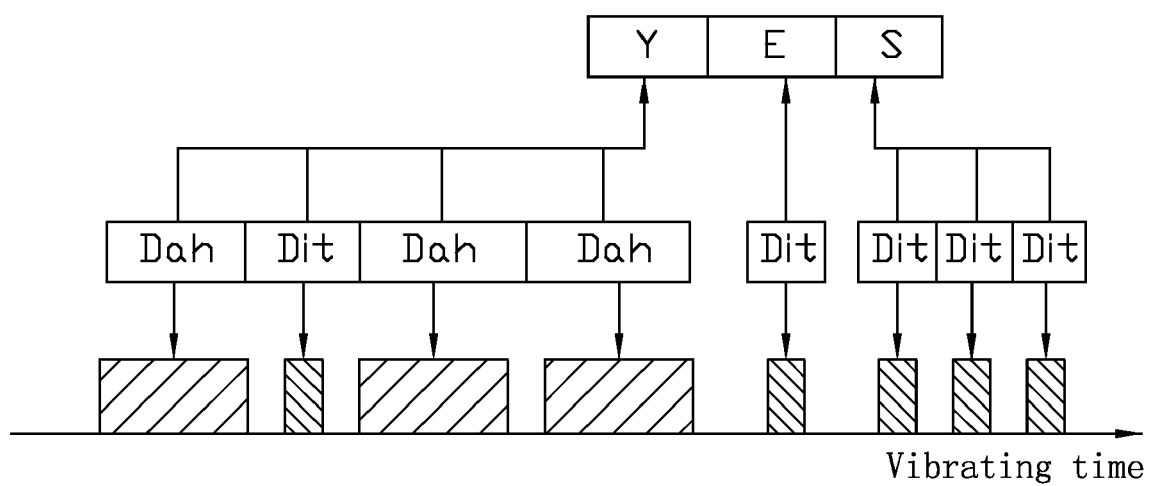
FIG. 4 is a schematic view of a method for using the wireless communication device shown in FIG. 1 to express a message via vibration.

Referring to FIG. 4, for example, a character message "Yes" is expressed by means of vibration. In the method of Morse, the letter Y is expressed by a combination of a dit and three dahs lines as in the order of dah, dit, dah dah; the letter E is expressed by a dit; and the letter S is expressed by a combination of three dits.

Furthermore, for expressing character messages predeterminedly, the rest time between two vibration corresponding two adjacent basic units used to express a same character has an upper limit, and the rest time between two vibration corresponding to two adjacent basic units respectively used to express two different characters has a floor limit. When the rest time between two vibration corresponding to two adjacent characters is less than the upper limit, the two vibration are regarded as expressing a same character; when the rest time between two vibration corresponding to two adjacent characters is larger than the floor limit, the two vibration are regarded as expressing two different characters. Apparently, the upper limit must be less than the floor limit to prevent vibrations expressing different characters from being mixed. In the present embodiment, the upper limit is 0.5 second, and the floor limit is 1 second.

Therefore, according to the aforementioned method, the character message "Yes" is expressed by vibration as follows: vibrating for 2 seconds, resting for 0.5 second, vibrating for 0.5 second, resting 0.5 second, vibrating 2 seconds, resting 0.5 second, vibrating 2 seconds (expressing the letter Y); resting 1 second; vibrating 0.5 second (expressing the letter E); resting 1 second; vibrating 0.5 second; resting 0.5 second; vibrating 0.5 second; resting 0.5 second; vibrating 0.5 second (expressing the letter S). In this way, the user of the wireless communication device 100 can recognize messages received by the wireless communication device 100 without viewing the display or hearing it ring.

Understandably, the aforementioned method of expressing character messages with vibration is the same with the method of Morse. Actually, additional vibrating outputting modes for expressing character messages more simply than the aforementioned method can be set via the controlling module 12 and stored in the storage module 32. For example, character messages with words such as "yes", "agree", "right", etc., can be all set to be expressed with a vibration for 0.5 seconds.

The sensor module 26 is a typical vibration sensor, such as a piezoelectricity sensor. The decoding module 28 is electronically connected to the sensor module 26. The sensor module 26 can receive vibration formed by knock or press on the sensing area 142, then transform the vibration into inputting signals, and transfer the inputting signals to the decoding module 28. Similarly to the method of expressing messages with vibration, the sensor module 26 transforms the vibration caused by knock or press on the sensing area 142 by means of the method of Morse. Two kinds of inputting actions are respectively used to input the two basic units, i.e., the basic unit dit and the basic unit dah. In the present embodiment, a short input action, i.e., a knock on the sensing area 142 is used to input the basic unit dit, and a long input action, i.e., a press for a predetermined time is used to input the basic unit dah. Understandably, the two basic units can also be input by means of other methods of knock or press on the sensing area 142.

Also similar to the method for expressing the character messages, for inputting character messages predeterminedly, the rest time between two inputting actions (i.e., the knock or press on the sensing area 142) corresponding two adjacent basic units used to input a same character has an upper limit, and the rest time between two inputting actions corresponding to two adjacent basic units respectively used to input two different characters has a floor limit. When the rest time between two inputting actions corresponding to two adjacent characters is less than the upper limit, the two inputting actions are regarded as inputting a same character; when the rest time between two inputting actions corresponding to two adjacent characters is larger than the floor limit, the two inputting actions are regarded as inputting two different characters. Apparently, the upper limit must be less than the floor limit to prevent inputting actions for inputting different characters being mixed. In the present embodiment, the upper limit is 1 second, and the floor limit is 2 second.

Figure 5:
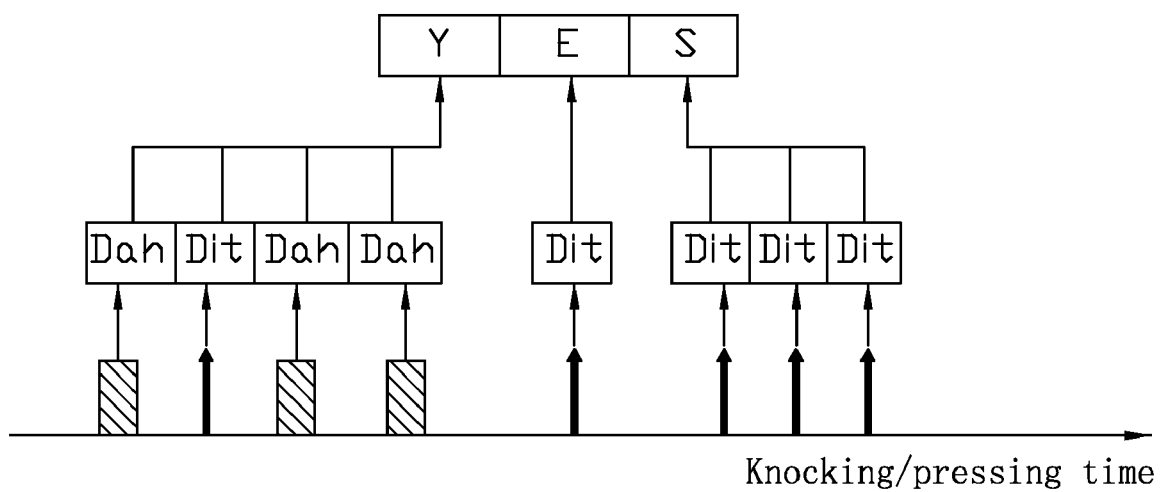
FIG. 5 is a schematic view of a method for inputting a message via vibration into the wireless communication device shown in FIG. 1.

Referring to FIG. 5, for example, a character message "Yes" is input into the wireless communication device 100. According to the aforementioned method, the character message "Yes" is input as follows: pressing the sensing area 142 for at least 0.5 second, releasing the sensing area 142 and resting not more than 1 second, knocking the sensing area 142, resting not more than 1 second, pressing the sensing area 142 for at least 0.5 second, releasing the sensing area 142 and resting not more than 1 second, pressing the sensing area 142 for at least 0.5 second (inputting the letter Y); resting at least 2 seconds; knocking the sensing area 142 (inputting the letter E); resting at least 2 seconds; knocking the sensing area 142, resting not more than 1 second, knocking the sensing area 142, resting not more than 1 second, knocking the sensing area 142 (inputting the letter S). The sensor module 26 transforms the vibration caused by knock or press into piezoelectric input signals and transfer the piezoelectric input signals to the decoding module 28.

The decoding module 28 transforms the piezoelectric input signals into code signals formed by the basic units dit corresponding to knocks on the sensing area 142 and the basic units dah corresponding to the presses on the sensing area 142. Thus, the decoding module 28 transforms the code signals into character messages according to predetermined methods, such as the method of Morse, i.e., the contrary operation of the method for transforming the character messages into code signals. Furthermore, for improving accuracy of the code signals, the rest time between inputting of two adjacent basic units respectively used to express two words can be set to be longer than the rest time between inputting of two adjacent basic units respectively used to input a same word. For example, the rest time between inputting of two adjacent basic units respectively used to input two letters of two adjacent words can be set to be 3 seconds.

Figure 3:
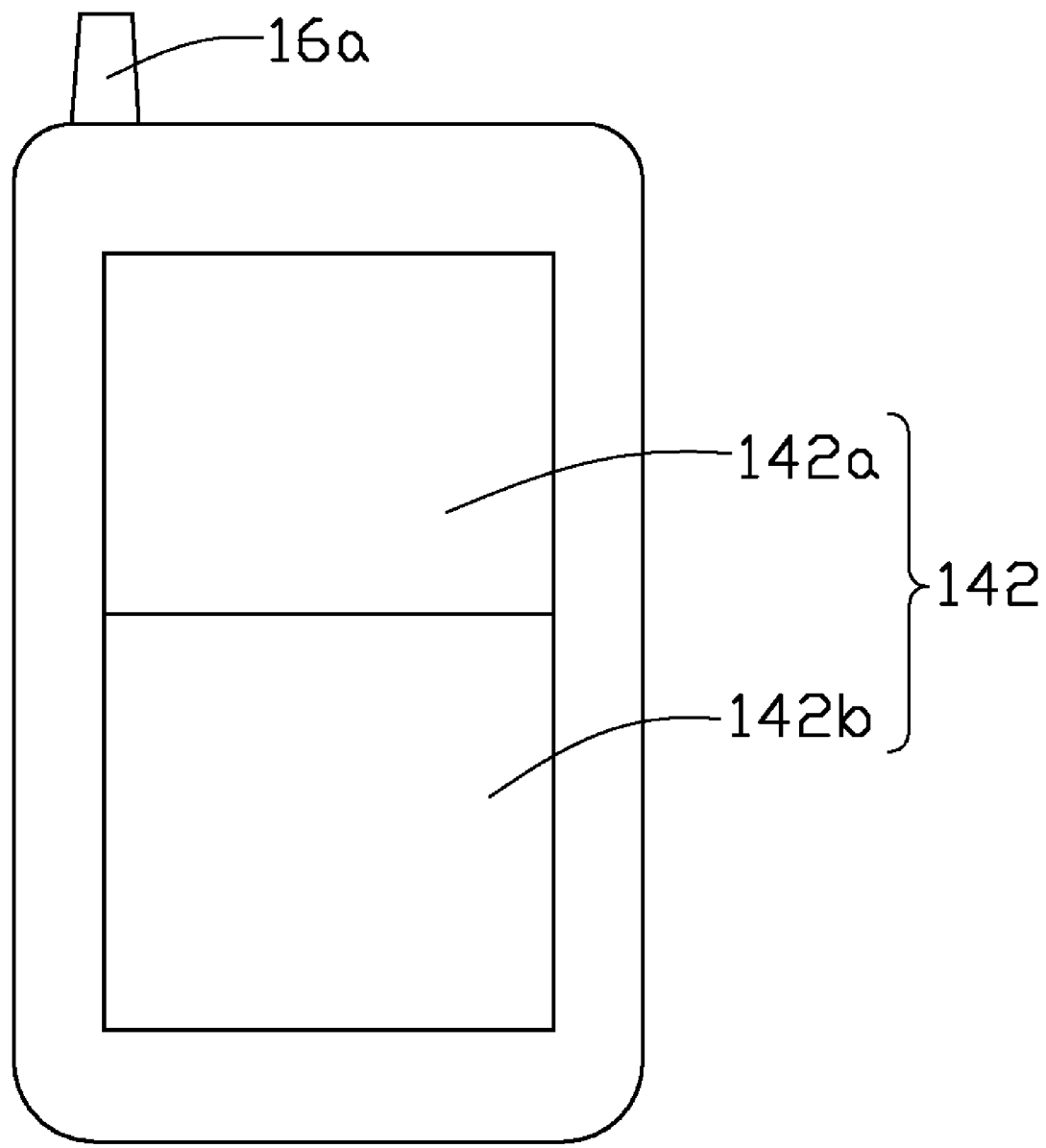
FIG. 3 is the back view of the wireless communication device shown in FIG. 2.

Additionally, also referring to FIG. 3, for inputting the basic units more simply than the aforementioned method, the sensing area 142 is divided into a first input area 142a and a second input area 142b. Knocking on the first input area 142a inputs a basic unit dit, and knocking on the second input area inputs a basic unit dah. Similar to the simple vibrating outputting modes for expressing character messages, additional input modes for inputting character messages can be set via the controlling module 12 and stored in the storage module 32. For example, character messages such as "yes", "agree", "right", etc., can be set to be inputted by means of one knock on the sensing area 142. In this way, most frequent messages can be simply input by vibration.

The storage module 32 is a memory device electronically connected to the controlling module 12. The storage module 32 is used to store necessary data of the wireless communication device 100, such as the aforementioned additional outputting modes and inputting modes, or other encoding methods and decoding methods.

In use, the wireless communication device 100 can be used in typical methods, such as communicating via voice, displaying character messages via screen, or inputting and sending character messages via keypad, etc. Other than the typical methods, the wireless communication device 100 can also function in a vibrating output mode or a vibrating input mode, or both at the same time. Users can set the wireless communication device to work in the vibrating output mode or the vibrating input mode via the input module 14 and the controlling module 12.

In the vibrating output mode, the encoding module 22 and the vibrating mode 24 are turned on, thus the wireless communication device 100 can express character messages by means of vibration. When the communicating module 16 receives character messages from the wireless communication network, the character messages are transferred to the encoding module 22. The encoding module then transforms the character message into code signals by means of the aforementioned method. The code signals are expressed by means of vibration of the vibrating module 24.

In the vibrating input mode, the decoding module 26 and the vibrating mode 28 are turned on, thus the wireless communication device 100 can send character messages by means of vibration. The user can knock or press the sensing areas 142 according to the aforementioned method to send character messages. The sensor module receives vibration generated from the sensing areas and transforms the vibration into piezoelectric input signals and transfers the piezoelectric input signals to the decoding module 28. The decoding module 28 then transforms the piezoelectric input signals into character messages according to aforementioned methods, and transfers the character messages to the communicating module 16 to send.

Understandably, besides the method of Morse, other encoding/decoding methods can also be used to express/input character messages via vibration. Several kinds of encoding/decoding methods can be stored in the storage module 32, thus the user can select any of the methods to express/input character messages via vibration. Additionally, relative parameters of express/input character messages via vibration, such as continuing time of vibration, resting time of vibration, and pressing time of input the basic unit dah, etc., can all be set and stored in the storage module 32.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A wireless communication device, comprising:
a communicating module configured for receiving and sending character messages;
a sensor module configured for receiving vibrations and transforming the vibrations into input signals; wherein the vibrations are caused by knocking and pressing actions applied to the wireless communication device, and when a rest time between two adjacent ones of the knocking/pressing actions is less than a predetermined upper input limit, vibrations caused by the two knocking/pressing actions are transformed into input signals for the same character; when a rest time between two adjacent ones of the knocking/pressing actions is larger than a predetermined floor input limit, vibrations caused by the two knocking/pressing actions are respectively transformed into input signals for two different characters; and
a decoding module electronically connected to the communicating module and the sensor module, the decoding module receiving the input signals from the sensor module and transforming the input signals into character messages and transferring the character messages to the communicating module to send.

2. The wireless communication device as claimed in claim 1 further comprising an input module which includes at least one sensing area defined on a surface of the wireless communication device, the sensor module receiving vibration caused by the knock or press when the sensing area is knocked or pressed.

3. The wireless communication device as claimed in claim 2 further comprising a storage module and a controlling module, the communicating module, the input module and the storage module being electronically connected to the controlling module.

4. The wireless communication device as claimed in claim 1, further comprising an encoding module electronically connected to the communicating module and a vibrating module electronically connected to the encoding module; wherein the encoding module transforms character messages received by the communicating module into code signals, and the vibrating module vibrates when receiving the code signals transformed by the encoding module.

5. The wireless communication module as claimed in claim 4, wherein the vibrating module is selectively to vibrate in response to the received code signals for a relatively short time period or a relatively long time period.

6. The wireless communication module as claimed in claim 4, wherein the vibration received by the sensor module is selectively caused by an input action for a relatively short time or an input action for a relatively long time.

7. A wireless communication device, comprising:
an encoding module;
a vibrating module electronically connected to the encoding module;
a sensor module; and
a decoding module electronically connected to the communicating module; the wireless communication having a vibrating output mode and a vibrating input mode; in the vibrating output mode, the encoding module transforming character messages received by the wireless communication device into code signals, and the vibrating module expressing the code signals by means of vibrations, wherein when a rest time between two vibrations of the vibrating module is less than a predetermined upper expressing limit, the two vibrations are regarded as expressing the same character of the character messages; and when a rest time between two vibrations of the vibrating module is larger than a predetermined floor expressing limit, the two vibrations are regarded as respectively expressing two different character of the character messages; in the vibrating input mode, the sensor module receiving special vibrations and transforming the vibrations into input signals, and the decoding module transforming the input signals into character messages; wherein the special vibrations are caused by knocking and pressing actions applied to the wireless communication device, and when a rest time between two adjacent ones of the knocking/pressing actions is less than a predetermined upper input limit, vibrations caused by the two knocking/pressing actions are transformed into input signals for the same character; when a rest time between two adjacent ones of the knocking/pressing actions is larger than a predetermined floor input limit, vibrations caused by the two knocking/pressing actions are respectively transformed into input signals for two different characters.

8. The wireless communication device as claimed in claim 7, further comprising an input module which includes at least one sensing area defined on a surface of the wireless communication device; the sensor module receiving vibration caused by the knock or press when the sensing area is knocked or pressed.

9. The wireless communication device as claimed in claim 8, further comprising a storage module and a controlling module, the communicating module, the input module and the storage module being all electronically connected to the controlling module.

10. The wireless communication device as claimed in claim 7, wherein the vibrating module is selectively to vibrate in response to the received code signals for a relatively short time period or a relatively long time period.

11. The wireless communication device as claimed in claim 7, wherein the vibration received by the sensor module is selectively caused by an input action for a relatively short time or an input action for a relatively long time.

12. The wireless communication device as claimed in claim 1, wherein the upper input limit is less than the floor input limit.

13. The wireless communication device as claimed in claim 4, wherein the vibrations of the vibrating module are used to express the character messages received by the communicating module; and when a rest time between two vibrations of the vibrating module is less than a predetermined upper expressing limit, the two vibrations are regarded as expressing the same character of the character messages; and when a rest time between two vibrations of the vibrating module is larger than a predetermined floor expressing limit, the two vibrations are regarded as respectively expressing two different character of the character messages.

14. The wireless communication device as claimed in claim 13, wherein the upper expressing limit is less than the floor expressing limit.

15. The wireless communication device as claimed in claim 7, wherein the upper expressing limit is less than the floor expressing limit, and the upper input limit is less than the floor input limit.

* * * * *